(12) United States Patent
Hanson et al.

(10) Patent No.: US 10,192,183 B2
(45) Date of Patent: Jan. 29, 2019

(54) SYSTEM AND METHOD FOR REAL COST ANALYSIS OF A COOLING SYSTEM (71) Applicant: TRANE INTERNATIONAL INC., Piscataway, NJ (US)

(72) Inventors: Susanna Staubly Hanson, La Crosse, WI (US); William Nelson Devroy, Saint Paul, MN (US); Anthony Wayne Bruno, Blaine, MN (US); Joel Donald Monroe, Brooklyn Center, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 1267 days.

(21) Appl. No.: 14/094,369

(22) Filed: Dec. 2, 2013

(65) Prior Publication Data

US 2014/0156335 A1    Jun. 5, 2014

Related U.S. Application Data (60) Provisional application No. 61/731,781, filed on Nov. 30, 2012.

(51) Int. Cl.
*G06F 7/10* (2006.01)
*G06Q 10/06* (2012.01)

(52) U.S. Cl.
CPC .............. *G06Q 10/06315* (2013.01)

(58) Field of Classification Search
CPC .......... G06K 7/10; G06K 19/00; G06F 17/00
USPC ........................ 235/376, 375, 487
See application file for complete search history.

(56) References Cited

U.S. PATENT DOCUMENTS

| | | | |
|---|---|---|---|
| 5,556,084 A | 10/1996 | Cmar | |
| 7,139,564 B2* | 11/2006 | Hebert | H04L 29/06 455/423 |
| 7,389,255 B2 | 6/2008 | Formisano | |
| 2003/0229572 A1* | 12/2003 | Raines | G06Q 10/06375 705/37 |
| 2005/0241323 A1 | 11/2005 | Miller et al. | |
| 2006/0065750 A1 | 3/2006 | Fairless | |
| 2009/0094173 A1* | 4/2009 | Smith | G01R 21/1335 705/412 |
| 2009/0228406 A1 | 9/2009 | Lopez et al. | |
| 2009/0228726 A1* | 9/2009 | Malik | G06F 1/3203 713/320 |
| 2010/0174643 A1 | 7/2010 | Schaefer et al. | |
| 2010/0199714 A1* | 8/2010 | Yanik | F25B 39/04 62/507 |
| 2010/0324962 A1 | 12/2010 | Nesler et al. | |
| 2011/0016342 A1* | 1/2011 | Rowan | G06F 11/3006 713/340 |
| 2011/0153090 A1* | 6/2011 | Besore | G05B 15/02 700/278 |
| 2011/0246155 A1 | 10/2011 | Fitch et al. | |
| 2011/0246381 A1 | 10/2011 | Fitch et al. | |
| 2012/0041696 A1 | 2/2012 | Sanderford, Jr. et al. | |
| 2012/0084063 A1 | 4/2012 | Drees et al. | |
| 2014/0337082 A1* | 11/2014 | Nofal | G06Q 10/06315 705/7.25 |

(Continued)

*Primary Examiner* — Edwyn Labaze
(74) *Attorney, Agent, or Firm* — Hamre, Schumann, Mueller & Larson, P.C.

(57) ABSTRACT

A system and a method for calculating in real time, actual realized savings that a cooling system obtains from addition of a thermal storage capability to the cooling system, compared to a model of the system without the added thermal storage capability.

15 Claims, 5 Drawing Sheets

(56) References Cited

U.S. PATENT DOCUMENTS

2015/0363515 A1* 12/2015 Singh .................. G06F 17/5004
703/1

* cited by examiner

SYSTEM AND METHOD FOR REAL COST ANALYSIS OF A COOLING SYSTEM

FIELD

This disclosure generally relates to a system and method for determining real cost analysis of a cooling system in real time.

BACKGROUND

Computer programs for estimating energy performance and/or modeling purely hypothetical cooling systems are known. Such programs can provide a computational model of a system and theoretical estimates of energy usage of such model of the system. The theoretical estimates are based on a set of data from a database. The theoretical estimates do not provide the real cost of an actual existing system based on real data, real cost of an existing system with a hypothetical modification (e.g. addition or deletion of a component), or cost of the existing system in real-time.

SUMMARY

The embodiments described herein relate to a system and a method for calculating in real time, actual realized savings that a cooling system obtains over another cooling system. In particular, the embodiments described herein relate to a system and a method for calculating in real time, actual realized savings that a cooling system obtains from a system with hypothetical modification(s) to that system. For example, the embodiments described herein can calculate in real time, actual realized savings of an existing cooling system having a thermal storage capability over a hypothetical modification of the existing cooling system without the thermal storage capability.

BRIEF DESCRIPTION OF THE DRAWINGS

Referring now to the drawings in which like reference numbers represent corresponding parts throughout.

DETAILED DESCRIPTION

It has been discovered that previously available systems and methods that use purely hypothetical computer model calculations cannot calculate real time savings, for example, from an addition of a thermal storage to a cooling system. The term real time is used herein to include, for example, without perceivable delay and/or within a strict time period limitation. Accordingly, calculating real time savings can mean calculating a savings as the savings are occurring without perceivable delay and/or determined within a set time period. These other systems and methods use a fixed set of information from a data base, and the information is not compensated for the active cooling being done by the system or by the cost of energy that changes with the addition of the thermal storage to the cooling system. That is, other purely hypothetical models cannot compensate for real time cost analysis because they are not affected by actual observed weather or cooling requirements which, when combined with a modification to the cooling system, can have a ripple effect on demand charges, load factor, and other utility charges and surcharges.

Further, it has been discovered that there is a problem with previously available systems and methods in calculating cost savings of adding a thermal storage system to a cooling system, wherein the previously available systems and methods underestimate the cost savings. This kind of underestimation can lead to incorrect assumptions, such as assuming that it would take longer than the actual time period for the payback of the initial cost for adding the thermal storage to the cooling system. Such inaccurate cost analysis leading to incorrect assumptions can serve as a market impediment because a purchaser may elect to invest the financial capital to a different area where the expected return is expected to be faster. Thus, a system and method as described herein for providing an accurate real time cost analysis for modifications to a cooling system can remove inaccurate assumptions and help remove market impediments by providing the purchaser with better information than what has been previously available.

The embodiments described herein are directed to a computer system and a method for calculating in real time, actual realized savings that a cooling system obtains, such as for example, from adding a thermal storage capability to the cooling system, compared to a model of the system without the added thermal storage capability. The computer system and computer implemented method includes a computer processor that calculates a base case without the addition of thermal storage capability based on a number of variables. The inventive control system and method includes the computer processor that aggregates energy used by the cooling system and calculates energy that would have been used by an equivalent system without using thermal storage. The computer processor executes a computer-readable instruction for calculating energy by, for example, hourly or quarter-hourly, so that the calculation can be compared to actual rate (e.g. commercial/utility rate) structures that are based on such periods. Thus, the computer processor can determine actual cost and actual use of energy for a given time period to show savings of a given system that is installed and operating compared to an alternate system that is not installed and operating. The computer processor can output information and results to a computer display device so that an operator can have access to real time estimated payback analysis that does not rely on pre-installation design phase estimates.

An embodiment of the system and method for calculating in real time, actual realized savings compensate for the following factors.

1. Proprietary performance characteristics of each equipment;

2. Complication of shifting of cooling generation to time of day with lower energy cost, and higher equipment efficiency, combined with the complex nature of energy tariffs, based on real time costs (for example, change in demand charges every 15 minutes);

3. Calculations of energy uses and energy costs calculated for a system with modification and a system without modification; and 4. Using sensors and/or metering for energy consumption of all components.

FIGS. 1-5 show embodiments of a user interface for a system for carrying out a method for calculating in real time, actual realized savings that a cooling system obtains from adding a thermal storage capability to the cooling system, compared to a model of the system without the added thermal storage capability.

Figure 1:
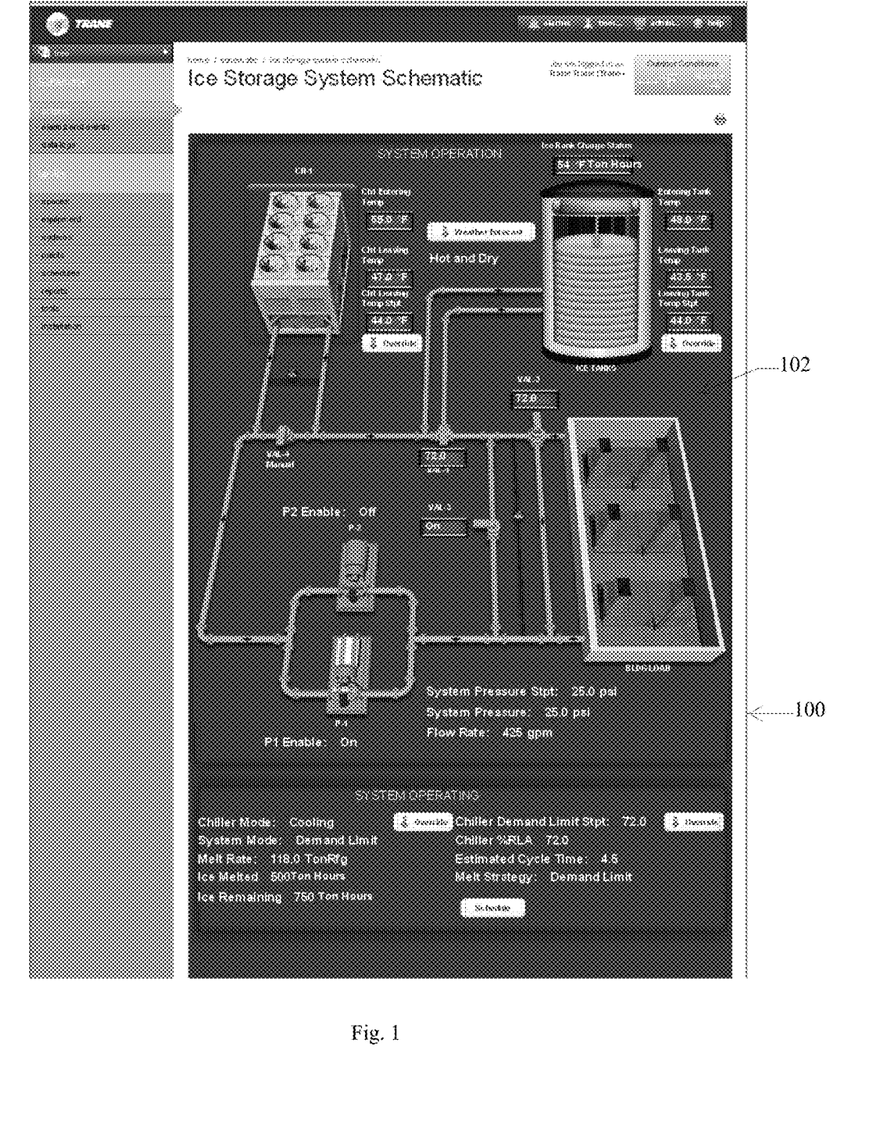
FIG. 1 illustrates an embodiment of a user interface of a system for carrying out a computer implemented method.

FIG. 1 shows the embodiment of the user interface 100 for a computer system displaying a schematic view of a cooling system 102 on a computer display.

Figure 2:
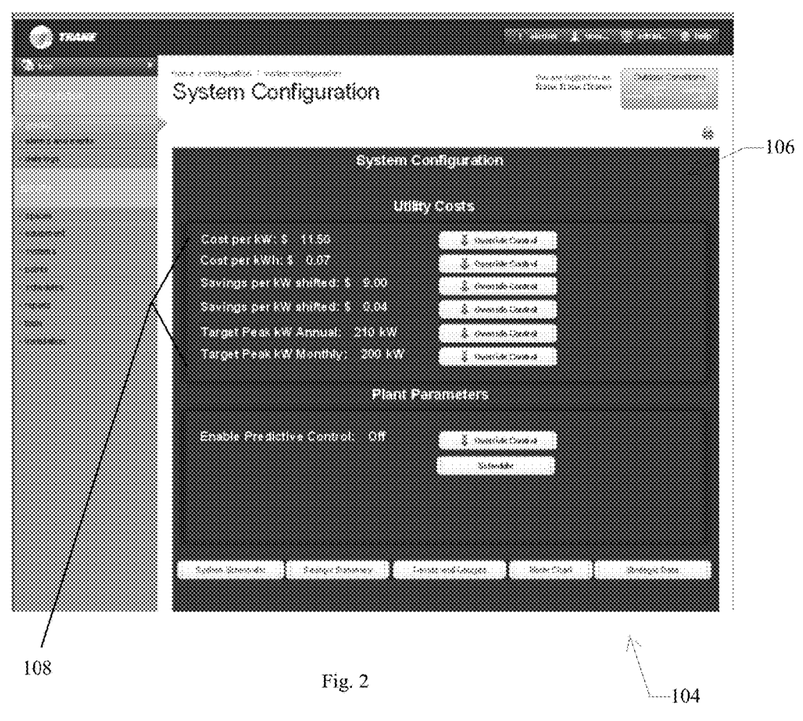
FIG. 2 illustrates an embodiment of a user interface of a system for carrying out a computer implemented method.

FIG. 2 shows the embodiment of the user interface 104 for the computer system displaying a system configuration 106 and real time costs 108 on the computer display.

Figure 3:
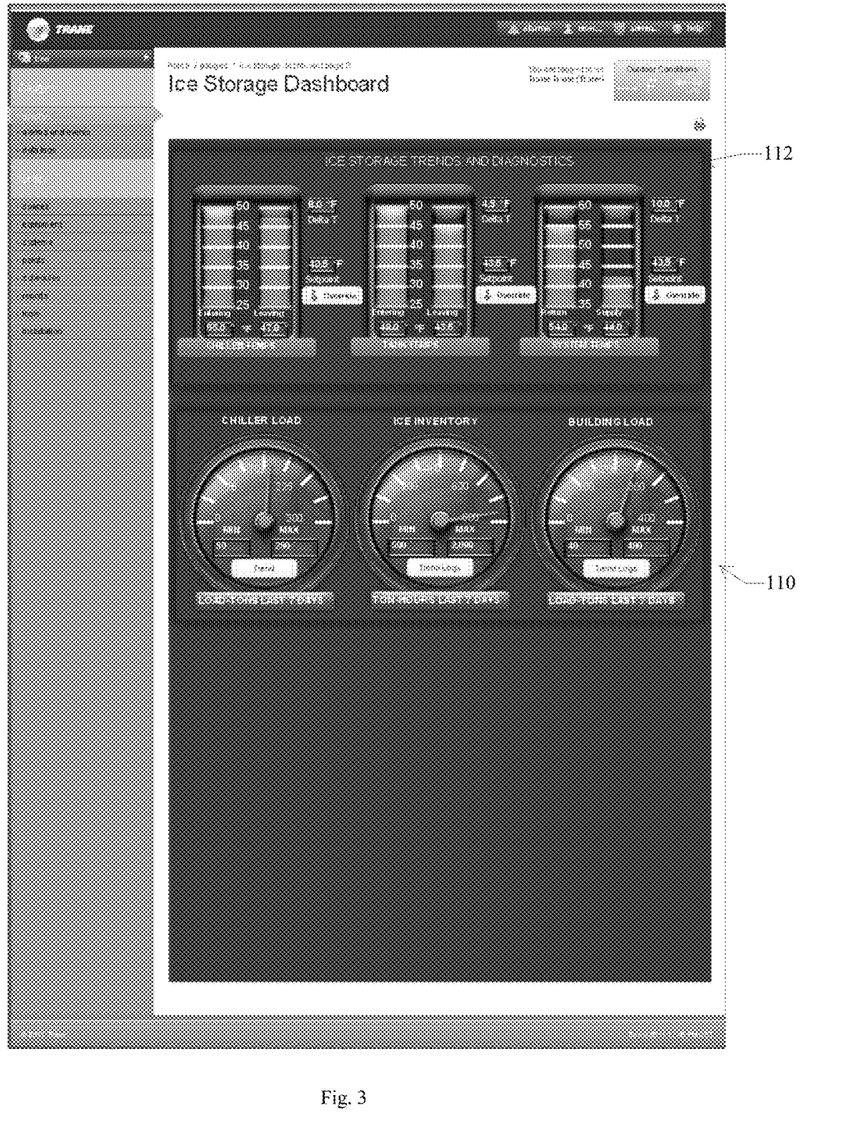
FIG. 3 illustrates an embodiment of a user interface of a system for carrying out a computer implemented method.

FIG. 3 shows the embodiment of the user interface 110 for the computer system displaying a "dash board" 112 of diagnostic information (data) graphically on the computer display.

Figure 4:
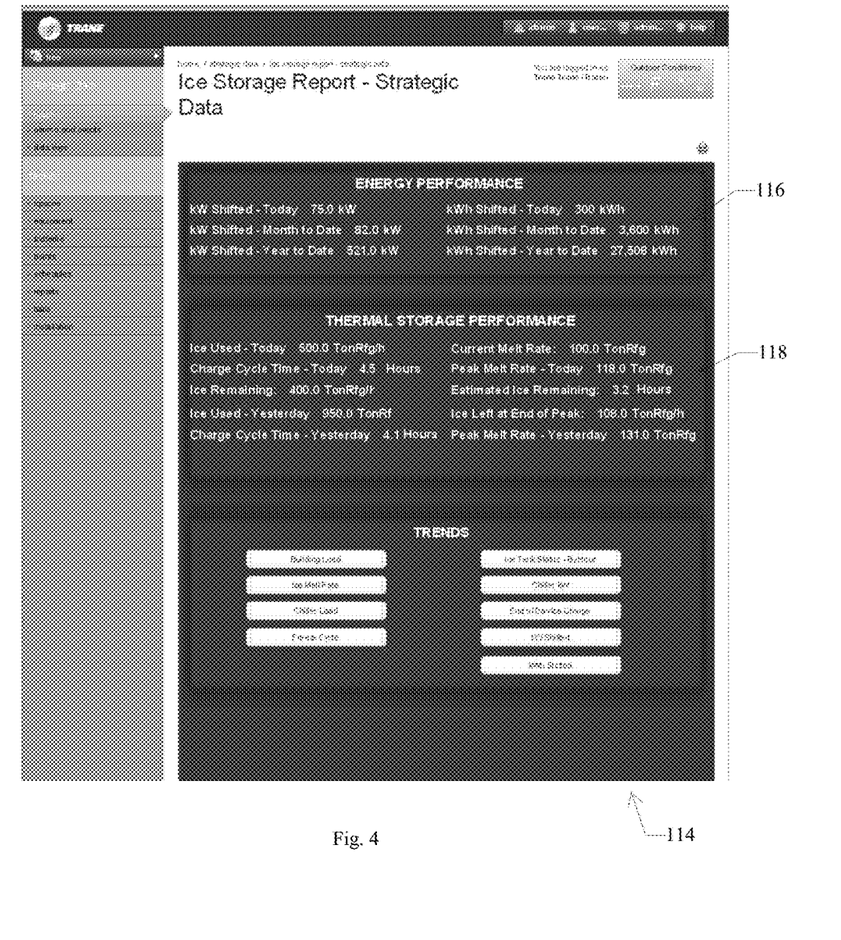
FIG. 4 illustrates an embodiment of a user interface of a system for carrying out a computer implemented method.

FIG. 4 shows the embodiment of the user interface 114 for the computer system outputting and displaying strategic data of energy performance 116 and thermal storage performance 118 on the computer display.

Figure 5:
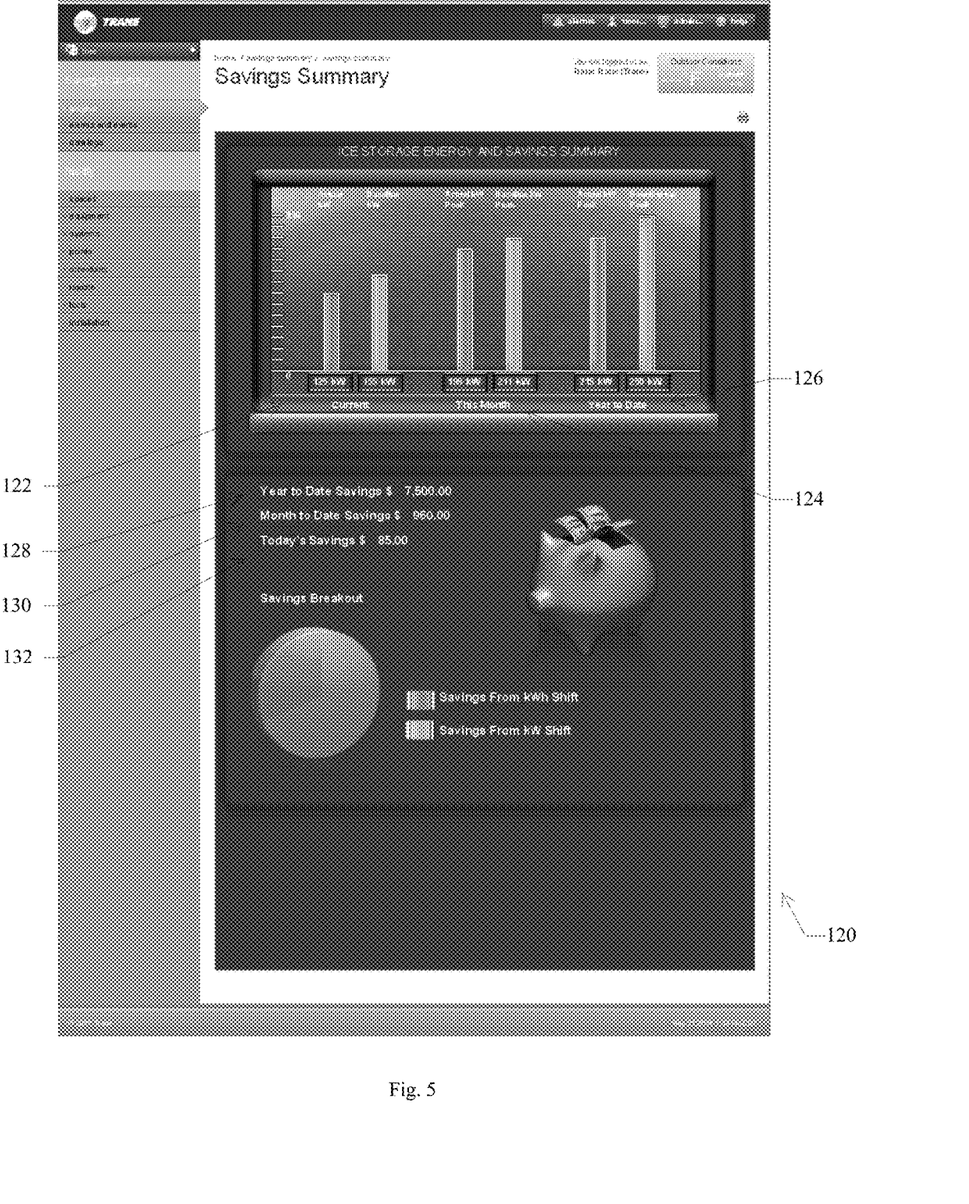
FIG. 5 illustrates an embodiment of a user interface of a system for carrying out a computer implemented method.

FIG. 5 shows the embodiment of the user interface 120 for the computer system outputting and displaying a real time cost analysis (e.g. thermal storage cost savings) in real time (time periods being displayed are "current" 122, "this month" 124, and "year to date" 126 on the computer display. The cost analysis view of the user interface also shows "Year to Date Savings" 128, "Month to Date Savings" 130, and "Today's Savings" 132.

A method for real cost analysis related to a potential modification of an existing cooling system comprises the steps of determining a base real cost per time period of the existing cooling system; generating an estimated real cost per time period of a model using the potential modification to the existing cooling system; and comparing the base real cost per time period to the estimated real cost per time period.

Following is an example of a cost analysis carried out by the computer processor of a computer system according to an embodiment. The following method is implemented in a computer program (i.e. computer instructions that is executable by a computer processor). The computer program is stored on a computer readable medium. A computer processor reads the computer instructions from the computer readable medium and executes the computer instructions to carry out the method according to the embodiment described in the example below. The example of the cost analysis method is for determining (e.g. predicting) chiller capacity and energy use for a cooling system savings calculation. The example uses editable performance information at reference conditions along with three performance curves for cooling capacity and efficiency to determine chiller operation at off-reference conditions. The performance curves can follow the structures from the DOE-2 (and its variants, such as for example, DOE2.1e, which is a widely used and accepted building energy analysis software tool), and/or from the EnergyPlus Energy Simulation software model(s) for electric chillers in cooling mode. The curve coefficients are editable by a user of the embodiment.

A step for the computer processor calculating savings of the as-built cooling system (i.e. existing cooling system) versus the "could have been system" (i.e. modified cooling system) is to collect observed condition(s) of a building using, for example, temperatures and flow measurements, and configured fluid type and percentage. The fluid type and percentage are entered and determined by the computer processor of the embodied system during a commissioning phase (e.g., when the system was installed). As changes to variables in the system occur, for example, if the fluid's glycol percentage is changed from 25% to 31%, this entry can be modified. A system load is derived from the flow rate times the system delta T times the glycol adjustment (an example calculation is below). The specific heat, specific density and specific gravity of the solution are computed from solution temp, concentration and type. Accordingly, heat per unit time (e.g., Q(Btu/h)) can be determined by the computer processor of the system and method using the formula below. An example of specific density computed is 8.34 lb/gallon.

$$Q(Btu/h)=(gallons/min)\times(60\ min/hour)\times(specific\ density)\times(specific\ gravity)\times specific\ heat\times delta\ T$$

Besides the cooling system/chiller load information, additional information can be included for calculating the chiller energy, such as for example: (1) chiller leaving temperature, and (2) entering condenser (water or air) temperature. The system and method includes determining the chiller leaving temperature, and the entering condenser (water or air) temperature. An outdoor air sensor connected to the computer processor on the air-cooled chiller can be used for detecting and/or determining the entering condenser air temperature. A water cooled version can use a temperature sensor in the entering condenser water box on the chiller, where the sensor can be connected to the computer processor for detecting and/or determining the entering condenser temperature.

If an observed building load is greater than a reference chiller capacity divided by the number of chillers, a calculation iterates and spreads the chiller load across up to "n" chillers, where "n" is the number of chillers entered into the system at the time of system commissioning.

Savings are calculated as a difference between the measured kW input, aggregated over the desired time step (e.g., day, month, year, etc.), and the calculated reference energy over the same time step.

The following information regarding an existing cooling system can be captured at the commissioning of the cooling system.
1. "Reference chiller capacity," which is a value corresponding to a sum of total chiller capacity that would have been installed in a hypothetical scenario.
2. "Number of chillers," which is a number of chillers that the cooling load would have been spread across in the hypothetical scenario.
3. "Reference chiller full load energy rate," which is energy required by one chiller at design conditions to meet the design conditions being delivered to the building load. This energy rate is determined at the conditions used to generate the performance curve coefficients.

In some embodiments, the performance curves can follow the structure of the DOE2.1e or EnergyPlus models for electric chillers in cooling mode, as follows.

1) The Cooling Capacity Function of Temperature Curve (i.e., the curve of the cooling capacity function of temperature) is a biquadratic performance curve with two independent variables: the leaving chilled water temperature and the entering condenser fluid temperature. The output of this curve is multiplied by the reference capacity to give the full-load cooling capacity at specific temperature operating conditions (e.g., at temperatures different from the reference temperatures). The curve has a value of 1.0 at the reference temperatures used to create the curve. The biquadratic curve can be valid for the range of water temperatures anticipated for the simulation.

$$ClgCapacityAmbModifier = a + b*T_{ChwLvg} + c*(T_{ChwLvg})^2 + d*T_{CondEnt} + e*(T_{CondEnt})^2 + f*(T_{ChwLvg})*(T_{CondEnt})$$

where

ClgCapacityAmbModifier=cooling capacity modifier as a function of the hourly $T_{ChwLvg}$ and $T_{CondEnt}$. This non-dimensional value is equal to 1 at reference temperatures used to generate the unloading curves.

$T_{ChwLvg}$=hourly leaving chilled water temperature, ° F.

$T_{CondEnt}$=hourly entering condenser fluid temperature, ° F. For a water-cooled condenser this will be the water temperature returning from the condenser loop (e.g., leaving the cooling tower). For air-cooled condensers this will be the entering outdoor air dry-bulb temperature. For evaporatively-cooled condensers this will be the entering outdoor wet-bulb temperature.

For a simulation time step, the chiller's available cooling capacity is calculated as follows:

$$ClgCapacityHrly = ClgCapacityAmbModifier*ClgRefCapacity$$

where

ClgCapacityHrly=available chiller capacity adjusted for current fluid temperatures, tons ClgRefCapacity=chiller capacity at reference temperatures used to generate the unloading curves ClgCapacityAmbModifier=cooling capacity modifier as a function of the hourly $T_{CondEnt}$ and $T_{ChwLvg}$ 2) The Energy Input to Cooling Output Ratio Function of Temperature Curve (i.e., the curve of the energy input to the cooling output ratio function of temperature) is a biquadratic performance curve that parameterizes the variation of the energy input to cooling output ratio (EIR) as a function of the leaving chilled water temperature and the entering condenser fluid temperature. The EIR is the inverse of the Coefficient of Performance (COP). The output of this curve is multiplied by the reference EIR (inverse of the reference COP) to give the full-load EIR at specific temperature operating conditions (e.g., at temperatures different from the reference temperatures). The curve has a value of 1.0 at the reference temperatures used to create the curve. The biquadratic curve should be valid for the range of water temperatures anticipated for the simulation.

$$ClgPowerAmbModifier = a + b*T_{ChwLvg} + c*(T_{ChwLvg})^2 + d*T_{CondEnt} + e*(T_{CondEnt})^2 + f*(T_{ChwLvg})*(T_{CondEnt})$$

where

ClgPowerAmbModifier=cooling ambient modifier as a function of the current hour's $T_{ChwLvg}$ and $T_{CondEnt}$. This non-dimensional value is equal to 1 at reference temperatures used to generate the unloading curves.

$T_{ChwLvg}$=leaving chilled water temperature, ° F.

$T_{CondEnt}$=entering condenser fluid temperature, ° F. For a water-cooled condenser this will be the water temperature returning from the condenser loop (e.g., leaving the cooling tower). For air- or evap-cooled condensers this will be the entering outdoor air dry-bulb or wet-bulb temperature, respectively.

An alternative method calculates the ambient modifier as a function of the heat sink temperature difference, e.g., $$ClgPowerAmbModifier = a + b*HeatSinkTD + c*HeatSinkTD^2 + d*HeatSinkTD^3$$

where

HeatSinkTD=$T_{DsnCondEnt}$-$T_{CondEnt}$ $T_{DsnCondEnt}$: design condenser entering temperature; generally 85° F. for water cooled, 95° F. dry bulb for air cooled and 75° F. wetbulb for evaporatively cooled, ° F.

$T_{CondEnt}$: entering condenser fluid temperature, ° F. For a water-cooled condenser this will be the water temperature returning from the condenser loop (e.g., leaving the cooling tower). For air- or evap-cooled condensers this will be the entering outdoor air dry-bulb or wet-bulb temperature, respectively.

a-d=regression curve fit coefficients

3) The Energy Input to Cooling Output Ratio Function of a Part-Load Ratio Curve (i.e., the curve of the energy input to the cooling output ratio function of a part-load ratio) is a polynomial performance curve that parameterizes the variation of the Energy Input Ratio (EIR) as a function of the part-load ratio. The EIR is the inverse of the COP, and the part-load ratio is the actual cooling load divided by the chiller's available cooling capacity. The output of this curve is multiplied by the reference EIR (inverse of the reference COP) and the Energy Input to Cooling Output Ratio Function of Temperature Curve to give the EIR at the specific temperatures and part-load ratio at which the chiller is operating. This curve has a value of 1.0 when the part-load ratio equals 1.0. The polynomial curve can be valid for the range of part-load ratios anticipated for the simulation.

$$ClgPwrPartLdModifier = a + b*PLR + c*PLR^2 + d*PLR^3 + e*PLR^4$$

where

PLR=hourly cooling part load ratio=QEvapLoadHrly/(ClgCapacityAmbModifier*ClgRefCapacity)

Note: PLR is not allowed to be greater than the maximum part-load ratio specified by the user or less than zero.

QEvapLoadHrly=hourly evaporator load

ClgCapacityAmbModifier=cooling capacity modifier as a function of hourly $T_{CondEnt}$ and $T_{ChwLvg}$ ClgRefCapacity=cooling capacity at reference TDsnCondWaterEnt and TDsnEvapWaterLvg The hourly demand at any hour is then given by:

$$ChillerPowerHrly = ClgFullLoadKw*ClgCapacityAmbModifier*ClgPowerAmbModifier*ClgPwrPartLdModifier$$

The example of the method described above is but one specific implementation of the method. One skilled in the art would appreciate that there are other specific ways of implementing the general methodology described herein.

With regard to the foregoing description, it is to be understood that changes may be made in detail without departing from the scope of the present invention. It is intended that the specification and depicted embodiment to be considered exemplary only, with a true scope and spirit of the invention being indicated by the broad meaning of the claims.

What is claimed is:

1. A computerized method for real cost analysis related to a modification to a physical structure of an existing cooling system, comprising: a computer processor determining a base real cost per time period of the existing cooling system; the computer processor generating an estimated real cost per time period of a model using the modification to a physical structure of the existing cooling system; and the computer processor comparing the base real cost per time period to the estimated real cost per time period, the computer processor outputting to a display a result of the real cost analysis related to the modification, wherein the modification includes one or more of: an addition of a thermal storage capability, and a removal of the thermal storage capability.

2. The computerized method according to claim 1, wherein the computer processor determining the base real cost per time period of the existing cooling system comprises:
   determining values for a temperature, a flow measurement, a fluid type in a solution, and a fluid percentage in the solution.

3. The computerized method according to claim 1, wherein the computer processor determining the base real cost per time period of the existing cooling system comprises:
   the processor determining a chiller leaving temperature, and an entering condenser temperature.

4. The computerized method according to claim 3, wherein the entering condenser temperature includes an entering air temperature.

5. The computerized method according to claim 3, wherein the entering condenser temperature includes a water temperature.

6. The computerized method according to claim 1, further comprising the computer processor determining heat per unit time.

7. The computerized method according to claim 1, wherein the computer processor generating the estimated real cost per time period of the model comprises:
   the processor using the values for the temperature, the flow measurement, the fluid type in the solution, and the fluid percentage in the solution.

8. The computerized method according to claim 1, wherein the computer processor generating the estimated real cost per time period of the model comprises:
   the processor determining a chiller leaving temperature, and an entering condenser temperature.

9. The computerized method according to claim 8, wherein the entering condenser temperature includes an entering air temperature.

10. The computerized method according to claim 8, wherein the entering condenser temperature includes a water temperature.

11. The computerized method according to claim 1, wherein the computer processor comparing the base real cost per time period to the estimated real cost per time period is performed in real time.

12. The method according to claim 1, wherein the modification is an actual modification.

13. The method according to claim 1, wherein the modification is a hypothetical modification.

14. A computer readable medium storing therein a computer readable instructions for a processor, wherein when the computer readable instructions is executed by the processor, the processor carries out the method according to claim 1.

15. A system for real cost analysis related to a modification of an existing cooling system, comprising: a display device; a processor; a memory in communication with the processor and having stored therein a computer readable instructions executable by the processor, wherein when executed by the processor, causes the processor to carry out: determine a base real cost per time period of the existing cooling system; generate an estimated real cost per time period of a model using the modification to the physical structure of the existing cooling system; and compare the base real cost per time period to the estimated real cost per time period; and output to the display device a result of comparing the base real cost per time period to the estimated real cost per time period, wherein the modification includes one or more of: an addition of a thermal storage unit to the physical structure of the existing cooling system, and a removal of the thermal storage unit from the physical structure of the existing cooling system.

* * * * *